United States Patent
Ye et al.

(10) Patent No.: US 11,720,197 B2
(45) Date of Patent: Aug. 8, 2023

(54) THREE-DIMENSIONAL TOUCH MODULE AND DETECTION METHOD THEREOF

(71) Applicant: TPK Touch Solutions (Xiamen) Inc., Fujian (CN)

(72) Inventors: Cai Jin Ye, Xiamen (CN); Chih-Cheng Chuang, Zhubei (TW); Lien-Hsin Lee, Taipei (TW); Tsai-Kuei Wei, Hukou Township, Hsinchu County (TW); Sun Po Lin, Zhudong Township, Hsinchu County (TW); Ren-Hung Wang, Taichung (TW); Yu-Ting Chan, Taoyuan (TW); Tai-Shih Cheng, Taipei (TW); Yan Zhao, Xiamen (CN)

(73) Assignee: TPK Touch Solutions (Xiamen) Inc., Fujian (CN)

(*) Notice: Subject to any disclaimer, the term of this patent is extended or adjusted under 35 U.S.C. 154(b) by 0 days.

(21) Appl. No.: 17/032,418

(22) Filed: Sep. 25, 2020

(65) Prior Publication Data

US 2021/0303096 A1  Sep. 30, 2021

(30) Foreign Application Priority Data

Mar. 27, 2020 (CN) .............................. 202010229000

(51) Int. Cl.
*G06F 3/041* (2006.01)
*G06F 3/044* (2006.01)
(Continued)

(52) U.S. Cl.
CPC .......... *G06F 3/0416* (2013.01); *G06F 3/0445* (2019.05); *G06F 3/043* (2013.01); *G06F 3/045* (2013.01); *G06F 2203/04105* (2013.01)

(58) Field of Classification Search
None
See application file for complete search history.

(56) References Cited

U.S. PATENT DOCUMENTS

2016/0054826 A1* 2/2016 Huppi .................... G06F 3/043
                                                    345/177
2018/0059866 A1* 3/2018 Drake ................. G06F 3/04186
(Continued)

FOREIGN PATENT DOCUMENTS

CN      205788139 U    12/2016
JP      2014186711 A   10/2014
(Continued)

*Primary Examiner* — Stephen T. Reed
(74) *Attorney, Agent, or Firm* — Cooper Legal Group, LLC (57) ABSTRACT

A detection method of a three-dimensional touch module includes: step S1, providing an input signal to a transmitting electrode layer; step S2, outputting a first output signal and transmitting the first output signal to a control module by a two-dimensional inputting assembly, and outputting a second output signal and transmitting the second output signal to the control module by a pressure sensing assembly; and step S3, determining, by the control module, a touch position according to the first output signal and a pressure value according to the second output signal. A three-dimensional touch module includes: a cover plate; a two-dimensional inputting assembly disposed under the cover plate and configured to output a first output signal; a pressure sensing assembly disposed under the cover plate and configured to output a second output signal; and a transmitting electrode layer disposed between the two-dimensional inputting assembly and the pressure sensing assembly.

17 Claims, 6 Drawing Sheets

(51) Int. Cl.
    *G06F 3/043*     (2006.01)
    *G06F 3/045*     (2006.01)

(56) References Cited

U.S. PATENT DOCUMENTS

2018/0166507 A1*   6/2018   Hwang ................ G06F 3/0412
2019/0253053 A1    8/2019   Nathan et al.

FOREIGN PATENT DOCUMENTS

| | | |
|---|---|---|
| JP | 2014219963 A | 11/2014 |
| JP | 2015133090 A | 7/2015 |
| JP | 2018097869 A | 6/2018 |
| KR | 20180066667 A | 6/2018 |
| KR | 20190003902 A | 1/2019 |
| KR | 20190004679 A | 1/2019 |
| TW | M527573 U | 8/2016 |
| TW | 201828004 A | 8/2018 |
| TW | 202011170 A | 3/2020 |
| TW | M610275 U | 4/2021 |

* cited by examiner

THREE-DIMENSIONAL TOUCH MODULE AND DETECTION METHOD THEREOF

CROSS-REFERENCE TO RELATED APPLICATION

This application claims priority to China Application Serial Number 202010229000.4, filed Mar. 27, 2020, which is herein incorporated by reference.

BACKGROUND

Technical Field

The present disclosure relates to touch input technology, and more particularly, to a three-dimensional touch module and a detection method thereof.

Description of Related Art

With the development of touch technology, display devices equipped with touch functions have been maturely applied to industrial electronics and consumer electronics products. For the detection of a touch point, whether on a capacitive screen or a resistive screen, different principles are used to determine the two-dimensional coordinates of the touch point on the display device and establish a two-dimensional coordinate system (X, Y). The detection of the touch point is equivalent to determining the position of the touch point in the X-axis direction and the position in the Y-axis direction, that is, determining the two-dimensional coordinates of the touch point.

In order to further enrich the display devices with touch function, some display devices have been equipped with pressure sensors to become three-dimensional input systems. For example, when matching different pressing force values through touch points in different positions, the corresponding functions can be set. In this way, the design can be enriched from the 3D architecture defined by the touch points (X, Y) and the pressure value (Z), thereby forming a display device including a three-dimensional touch module.

Figure 1:
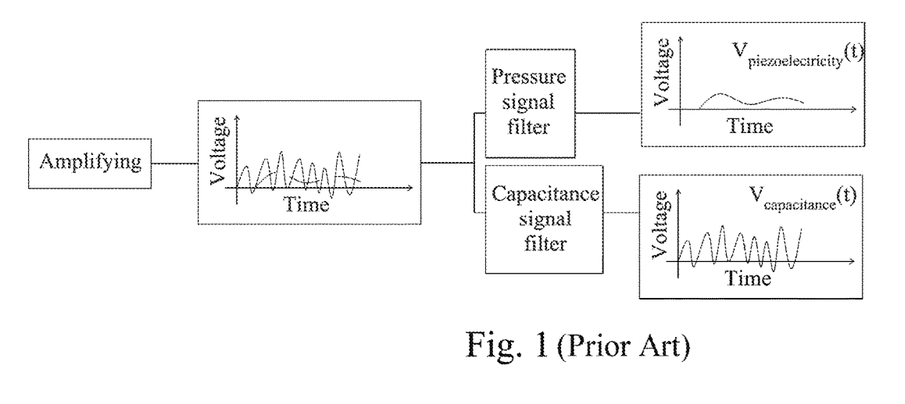
FIG. 1 is a schematic diagram of signal detection of a three-dimensional input module in the prior art.
Figure 2:
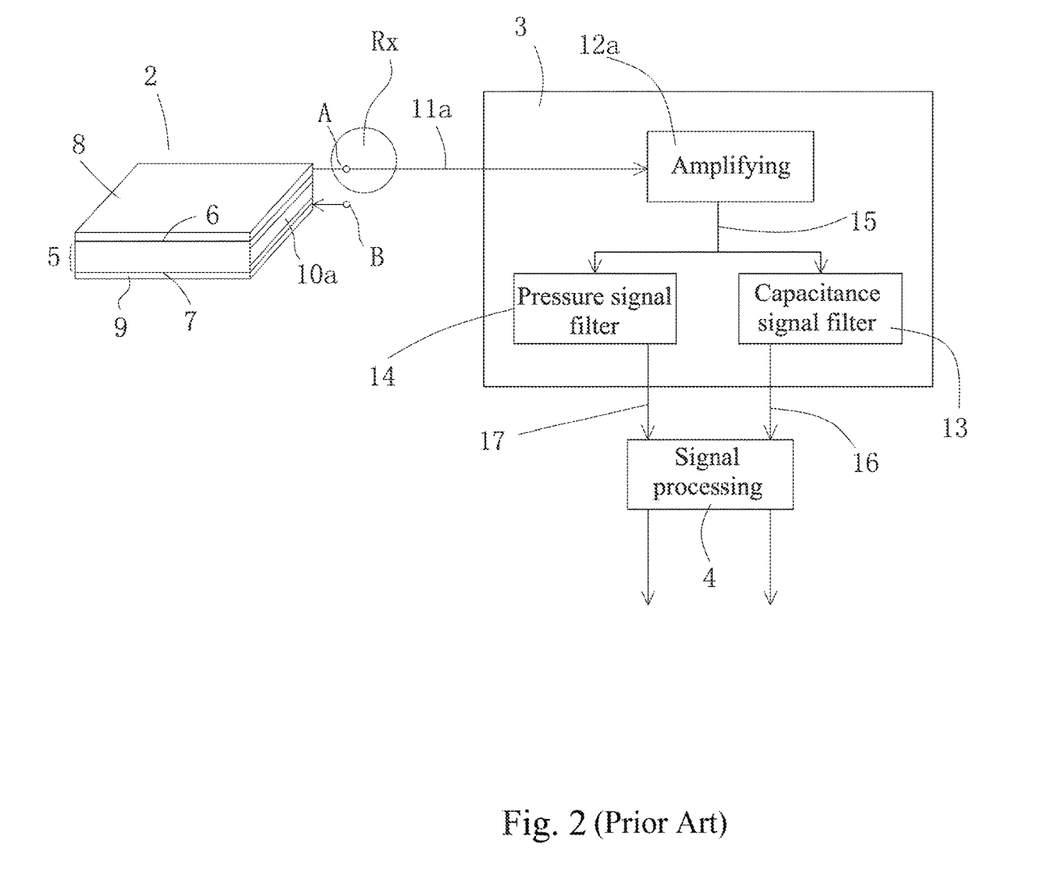
FIG. 2 is a schematic diagram of a signal processing flow of a three-dimensional input module in the prior art.

However, electrical signal interference in the three-dimensional touch module is very serious, which reduces the measurement accuracy of the touch position and pressure value. Therefore, how to extract the touch signal and the pressure signal at the same time is a big challenge for the control module. In the signal separation method adopted in the prior art, the pressure signal and the touch signal generated by each touch need to be filtered before the processing by the amplifier and the sensing by the chip. Reference is made to FIGS. 1 and 2. FIG. 2 shows contacts A, B, a receiving end Rx, a touch sensor 2, a front-end module 3, a signal processing module 4, a layer structure 5, a piezoelectric material layer 10a, a first surface 6, a second surface 7, a first electrode 8, a second electrode 9, an output terminal receiving signal 11a, an amplifying module 12a, a pressure signal filter 14, a capacitance signal filter 13, a signal 15, a first filter signal 16, and a second filter signal 17. This method has the following disadvantages:

(1) The extracted touch signal and pressure signal are mixed, making it more difficult to extract the pressure signal.

(2) The signal processing technology is complex, the requirements for the control module are high, and the signal interference problem is serious.

Accordingly, how to provide a low-cost and effective non-interference three-dimensional touch assembly and detection method for detecting touch signals and pressure signals becomes an important issue to be solved by those in the industry.

SUMMARY

In order to overcome the problems in the prior art, the present disclosure provides a three-dimensional touch module and a detection method thereof.

The solution to the technical problem of the present disclosure is to provide a detection method of a three-dimensional touch module. The detection method is applied to a three-dimensional touch module including a control module, a two-dimensional inputting assembly, a transmitting electrode layer, and a pressure sensing assembly. The detection method includes: step S1: providing an input signal to the transmitting electrode layer; step S2: outputting a first output signal and transmitting the first output signal to the control module by the two-dimensional inputting assembly, and outputting a second output signal and transmitting the second output signal to the control module by the pressure sensing assembly; and step S3: determining a touch position according to the first output signal by the control module, and determining a pressure value according to the second output signal by the control module.

In an embodiment of the disclosure, the first output signal and the second output signal are independent of each other.

In an embodiment of the disclosure, the two-dimensional inputting assembly is a capacitive input assembly, a resistive input assembly, or an ultrasonic input assembly.

In an embodiment of the disclosure, the first output signal corresponds to a capacitive sensing signal of the touch position, and the second output signal corresponds to a piezoelectric signal of the pressure value.

In an embodiment of the disclosure, when the first output signal and the second output signal are output in an identical time sequence, the step S3 includes: step Sa: receiving, by the control module, the capacitive sensing signal output by the two-dimensional inputting assembly to complete detection of the touch position, and receiving, by the control module, the piezoelectric signal generated by the pressure sensing assembly to complete detection of the pressure value.

In an embodiment of the disclosure, when the first output signal and the second output signal are output in different time sequences, the step S3 includes: step Si: receiving, by the control module, the capacitive sensing signal output by the two-dimensional inputting assembly to determine the touch position; step Sj: grounding the two-dimensional inputting assembly and the transmitting electrode layer; and step Sk: receiving, by the control module, the piezoelectric signal output by the pressure sensing assembly to determine the pressure value.

In an embodiment of the disclosure, the two-dimensional inputting assembly includes a receiving electrode layer. The pressure sensing assembly includes a pressure layer and a conductive layer that are superimposed.

In an embodiment of the disclosure, the conductive layer is a silver nanowire conductive layer, a metal grid, or an indium tin oxide semiconductor transparent conductive film.

In an embodiment of the disclosure, the two-dimensional inputting assembly and the pressure sensing assembly share the transmitting electrode layer.

A three-dimensional touch module includes a control module and a three-dimensional touch assembly electrically connected thereto. The three-dimensional touch assembly includes: a cover plate; a two-dimensional inputting assembly disposed under the cover plate and configured to output a first output signal; a pressure sensing assembly disposed under the cover plate and configured to output a second output signal; and a transmitting electrode layer disposed between the two-dimensional inputting assembly and the pressure sensing assembly.

In an embodiment of the disclosure, the two-dimensional inputting assembly includes a receiving electrode layer. The receiving electrode layer is configured to receive and output the first output signal. The pressure sensing assembly includes a pressure layer and a conductive layer. The pressure layer and the conductive layer are superimposed. The pressure layer is connected to the transmitting electrode layer. The pressure layer is configured to generate the second output signal. The conductive layer is configured to receive and output the second output signal. The control module is electrically connected to the receiving electrode layer to be configured to receive the first output signal. The control module is electrically connected to the conductive layer to be configured to receive the second output signal.

In an embodiment of the disclosure, when the first output signal and the second output signal are output in an identical time sequence, the transmitting electrode layer receives an input signal, and the receiving electrode layer outputs the first output signal to the control module to complete detection of a touch position, while the second output signal generated by the conductive layer relative to the control module is transmitted to the control module to complete detection of a pressure value.

In an embodiment of the disclosure, when the first output signal and the second output signal are output in different time sequences, in a first time sequence, the transmitting electrode layer receives an input signal and the receiving electrode layer outputs the first output signal to the control module to complete detection of a touch position; and in a second time sequence, the transmitting electrode layer and the receiving electrode layer are grounded and the conductive layer transmits the second output signal to the control module to complete detection of a pressure value.

In an embodiment of the disclosure, the first output signal is a capacitive sensing signal, a resistance signal, or an ultrasonic signal. The second output signal is a piezoelectric signal.

In an embodiment of the disclosure, the two-dimensional inputting assembly and the pressure sensing assembly share the transmitting electrode layer.

Compared with the prior art, the three-dimensional touch module and the detection method thereof of the present disclosure have the following advantages:

(1) By arranging a two-dimensional input assembly and a pressure sensing assembly in the three-dimensional touch module, the three-dimensional touch module can output the first output signal and the second output signal through the two-dimensional inputting assembly and the pressure sensing input assembly, respectively, such that the control module directly analyzes the first output signal and the second output signal to obtain the touch position corresponding to the first output signal and the pressure value corresponding to the second output signal. The configuration requirements for the control module are reduced, thereby effectively reducing the production and use cost of the three-dimensional touch module.

(2) The first output signal and the second output signal are independent of each other, which can effectively reduce the interference between the two signals in the signal extraction process of the control module and improve the accuracy of signal extraction.

(3) The first output signal corresponds to the touch position, and the second output signal corresponds to the pressure value. Through the setting of two types of signals, the difficulty of signal processing by the control module is greatly reduced, so that more different types of control modules can be adapted to this three-dimensional touch assembly. That is, it can make the scope of application of the three-dimensional touch assembly wider and can also effectively reduce the production cost and use cost of the control module.

(4) The two-dimensional input assembly and the pressure sensing assembly share the same transmitting electrode layer, so that different input signals are configured through the transmitting electrode layer, so that the first output signal and the second output signal being generated sequentially or simultaneously can be realized.

(5) The control module detects and processes the first output signal and the second output signal simultaneously, which can effectively improve the response speed of the three-dimensional touch assembly.

(6) The control module detects and processes the first output signal and the second output signal in different time sequences, so that the control module can detect the two signals more accurately. At the same time, the detection and processing method of different time sequences have lower requirements for the configuration of the control module, which can effectively reduce the production and use costs of the three-dimensional touch assembly.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 4:
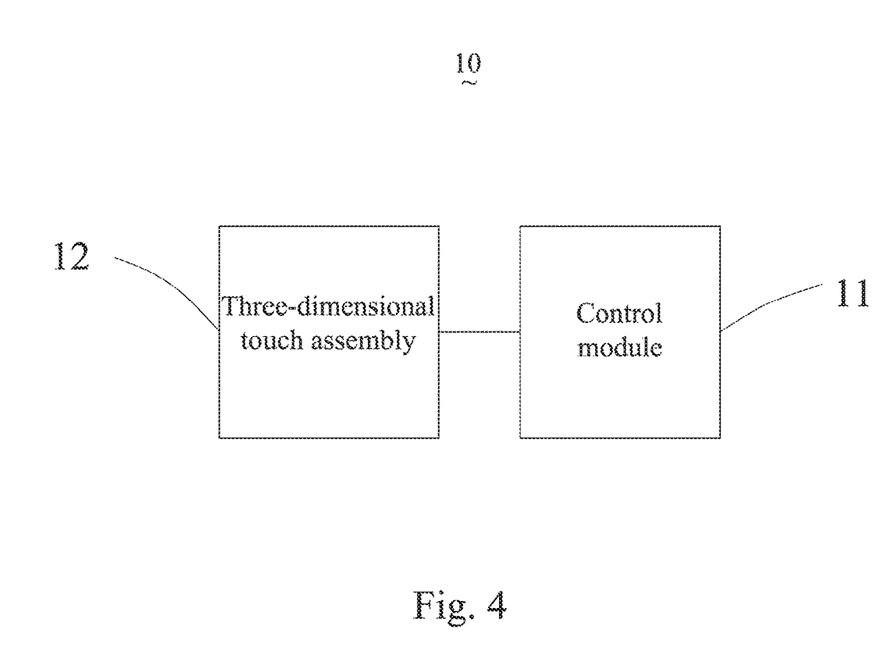
FIG. 4 is a schematic diagram of a three-dimensional touch module of a first embodiment of the present disclosure.
Figure 5:
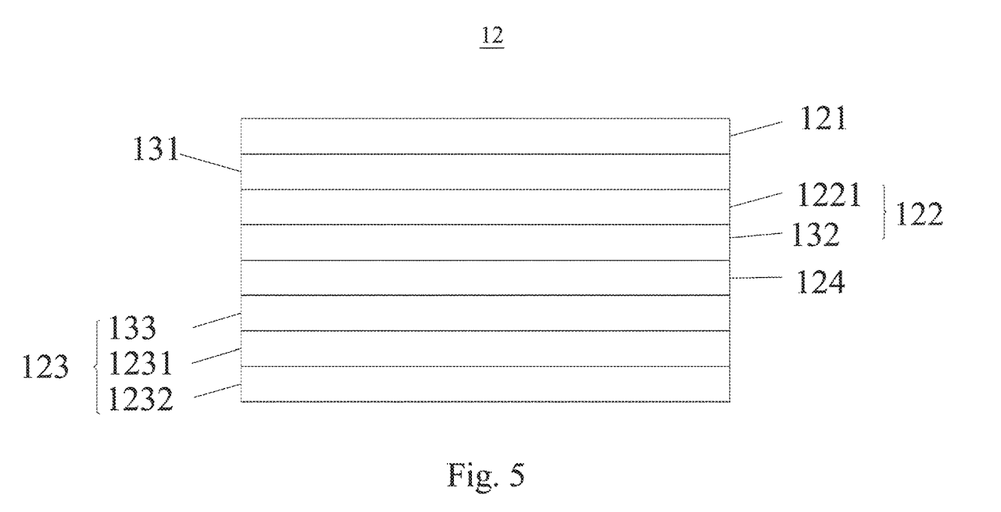
FIG. 5 is a schematic diagram of a layered structure of a three-dimensional touch assembly of the three-dimensional touch module according to the first embodiment of the present disclosure.

Reference is made to FIG. 4 with reference to FIG. 5. A first embodiment of the present embodiment provides a three-dimensional touch module 10, which includes a control module 11 and a three-dimensional touch assembly 12. The control module 11 is electrically connected to the three-dimensional touch assembly 12 to transmit the signal output by the three-dimensional touch assembly 12 to the control module 11.

The three-dimensional touch assembly 12 includes a cover plate 121, a first adhesive layer 131, a two-dimensional inputting assembly 122, a transmitting electrode layer 124, and a pressure sensing assembly 123 that are sequentially stacked. The two-dimensional inputting assembly 122 includes a receiving electrode layer 1221 and a second adhesive layer 132 that are superimposed. The pressure sensing assembly 123 includes a third adhesive layer 133, a pressure layer 1231, and a conductive layer 1232 that are superimposed.

Specifically, the two-dimensional inputting assembly 122 is configured to generate and output a first output signal. The pressure sensing assembly 123 is configured to generate and output a second output signal. The transmitting electrode layer 124 is configured to receive an input signal.

The control module 11 is electrically connected to the two-dimensional inputting assembly 122 and the pressure sensing assembly 123 to be configured to receive the first output signal output by the two-dimensional inputting assembly 122 and the second output signal output by the pressure sensing assembly 123. Therefore, the control module 11 can determine the touch position through the received first output signal and determine the pressure value through the received second output signal.

The cover plate 121 may be regarded as the touch cover on the three-dimensional touch assembly 12. The so-called cover plate 121 includes a touch operation surface and an assembly mounting surface. The touch operation surface is used for touch operations with fingers or stylus. The assembly mounting surface is used for mounting the three-dimensional touch assembly 12 or a display module.

The material of the cover plate 121 may be glass, or may also be PEEK (polyetheretherketone), PI (Polyimide), PET (polyethylene terephthalate), PC (polycarbonate polycarbonate), PES (polyethylene succinate), PMMA (polymethyl methacrylate), or a composite of any two of the aforementioned materials.

The first adhesive layer 131, the second adhesive layer 132, and the third adhesive layer 133 may be selected from OCA (Optical Clear Adhesive) or LOCA (Liquid Optical Clear Adhesive).

As an embodiment, the transmitting electrode layer 124 can be shared by the two-dimensional inputting assembly 122 and the pressure sensing assembly 123.

Reference is still made to FIG. 4 with reference to FIG. 5. In the present embodiment, the two-dimensional inputting assembly 122 is electrically connected to the control module 11 through the receiving electrode layer 1221, so that the control module 11 can receive the first output signal output by the receiving electrode layer 1221.

The pressure sensing assembly 123 is electrically connected to the control module 11 through the conductive layer 1232, so that the control module 11 can receive the second output signal output by the conductive layer 1232.

Specifically, the first output signal output by the receiving electrode layer 1221 may be a capacitive sensing signal, a resistance signal, or an ultrasonic signal. In this embodiment, the first output signal is a capacitive sensing signal. The second output signal output by the conductive layer 1232 is a piezoelectric signal. The piezoelectric signal is generated by a force deformation of the pressure layer 1231, and then the piezoelectric signal is transmitted to the conductive layer 1232 and output by the conductive layer 1232.

In the present embodiment, the material used for the transmitting electrode layer 124 and the receiving electrode layer 1221 is Indium Tin Oxide (ITO) because of its good conductivity and transparency. Therefore, using this material as the transmitting electrode layer 124 and the receiving electrode layer 1221 can not only meet the functional requirements, but also affect the display effect of the three-dimensional touch assembly 12 as little as possible.

As an embodiment, the thickness of the transmitting electrode layer 124 and the receiving electrode layer 1221 is about 35 μm to about 180 μm. Furthermore, the thickness of the transmitting electrode layer 124 and the receiving electrode layer 1221 may also be about 50 μm to about 150 μm. Specifically, the thickness of the transmitting electrode layer 124 and the receiving electrode layer 1221 may be about 50 μm, 60 μm, or 75 μm. In this embodiment, the thickness of the transmitting electrode layer 124 and the receiving electrode layer 1221 is about 50 μm.

The material used for the pressure layer 1231 may be lithium gallate, lithium germanate, piezoelectric ceramics, polyvinylidene fluoride, or ink. In this embodiment, the material used for the pressure layer 1231 is Polyvinylidene Fluoride (PVDF). By using the principle that the deformation of the PVDF film can generate piezoelectric induction, the PVDF film is prepared as the pressure layer 1231, so that when the pressure layer 1231 is deformed due to pressure during use, a piezoelectric signal can be generated.

The conductive layer 1232 may be a silver nanowire conductive layer, a metal grid, or an indium tin oxide semiconductor transparent conductive film (ITO film). In the present embodiment, the conductive layer 1232 is a silver nanowire conductive layer 1232. In one solution of the present embodiment, the pressure layer 1231 is made of polyvinylidene fluoride with better light transmittance and is combined with the silver nanowire conductive layer 1232, so that the pressure sensing assembly 123 has good light transmittance, which can effectively reduce the influence on the display effect of the three-dimensional touch assembly 12.

Reference is still made to FIG. 4 with reference to FIG. 5. The process of using the three-dimensional touch module 10 provided by the present disclosure to perform touch position detection and pressure detection can be referred to as follows: when a finger or a stylus is operated on the cover plate 121, the transmitting electrode layer 124 receives an input signal, and the receiving electrode layer 1221 of the two-dimensional inputting assembly 122 generates a first output signal based on a specific operation signal and outputs the first output signal to the control module 11; the pressure layer 1231 of the pressure sensing assembly 123 is deformed due to the pressure to generate a second output signal, and the second output signal is output from the conductive layer 1232 to the control module 11; the control module 11 is electrically connected to the two-dimensional inputting assembly 122 and the pressure sensing assembly 123 to obtain the first output signal output by the two-dimensional inputting assembly 122 and the second output signal output by the pressure sensing assembly 123; and the control module 11 processes the obtained first output signal and the obtained second output signal to obtain the touch position corresponding to the first output signal and the pressure value corresponding to the second output signal.

It can be understood that, in the above process, the output of the first output signal and the second output signal may be performed in an identical time sequence or different time sequences.

Figure 6:
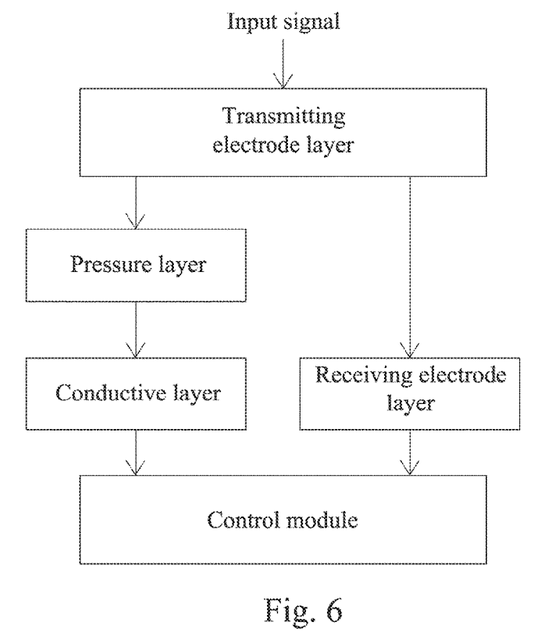
FIG. 6 is a schematic diagram of a flow of detection of output signals in identical time sequences by the control module of the three-dimensional touch module according to the first embodiment of the present disclosure.

Specifically, reference is made to FIG. 6. When the first output signal and the second output signal are output in an identical time sequence, the specific implementation is that the transmitting electrode layer 124 receives the input signal, and the receiving electrode layer 1221 generates a capacitive sensing signal based on a specific operation signal and outputs the capacitive sensing signal to the control module 11 to complete the detection of the touch position. At the same time, the piezoelectric signal generated by the conductive layer 1232 is transmitted to the control module 11 to complete detection of the pressure value.

Figure 7:
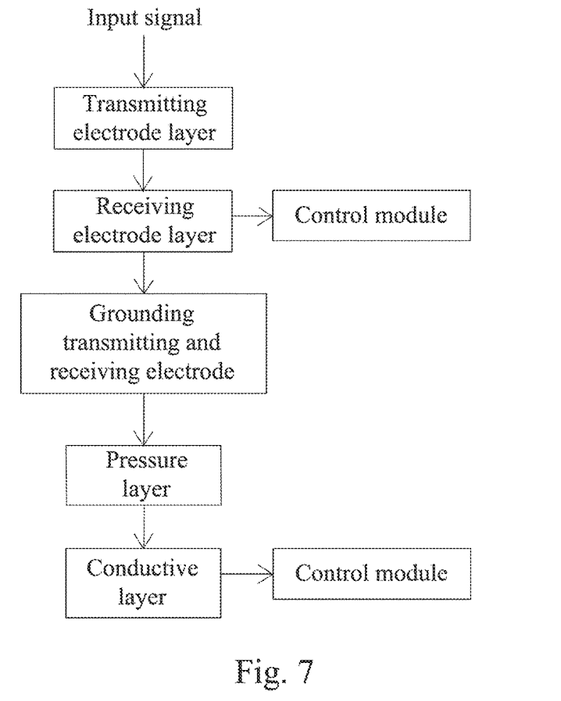
FIG. 7 is a schematic diagram of a flow of detection of output signals in different time sequences by the control module of the three-dimensional touch module according to the first embodiment of the present disclosure.

Reference is made to FIG. 7. When the first output signal and the second output signal are output in different time sequences, the specific implementation is that in a first time sequence, the transmitting electrode layer 124 receives an input signal, and the receiving electrode layer 1221 generates the first output signal based on a specific operation signal and outputs the first output signal to the control module 11 to complete detection of the touch position; and in a second time sequence, the transmitting electrode layer 124 and the receiving electrode layer 1221 are grounded, the pressure layer 1231 is deformed by pressure to generate a piezoelectric signal, and the conductive layer 1232 transmits the piezoelectric signal to the control module 11 to complete detection of the pressure value.

As an embodiment, when the first output signal and the second output signal are output in different time sequences, there is no time interval between the first time sequence and the second time sequence. That is, after the steps in the first time sequence are completed, the steps in the second time sequence begin immediately.

As another embodiment, when the first output signal and the second output signal are output in different time sequences, a time interval is set between the first time sequence and the second time sequence. That is, after the steps in the first time sequence are completed, the steps in the second time sequence begin after a predetermined time interval. The time interval may be 0.05 s, 0.1 s or 0.3 s, but the time interval is not specifically limited to the aforementioned examples.

Figure 8:
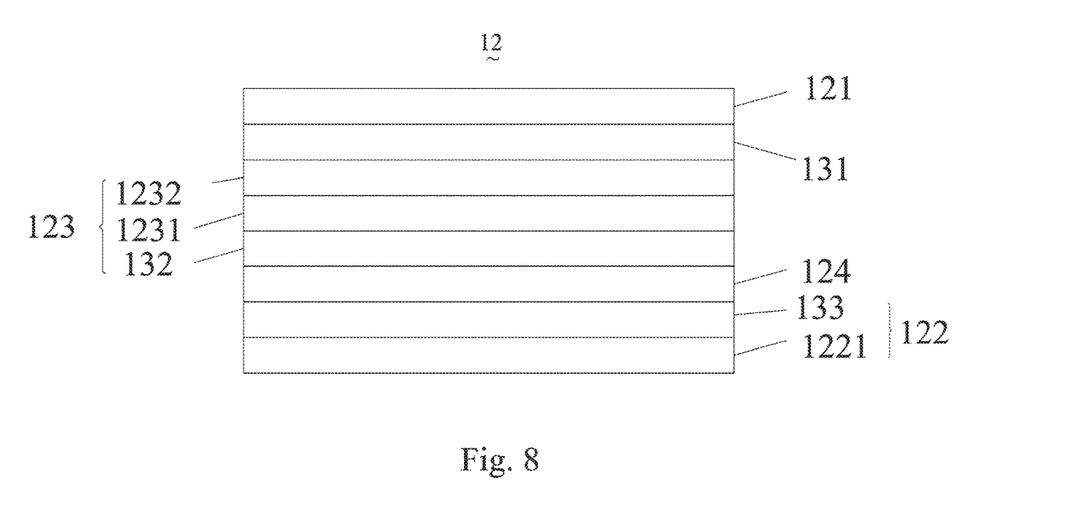
FIG. 8 is a schematic diagram of a layered structure of a first modified implementation of the three-dimensional touch assembly of the three-dimensional touch module of the first embodiment of the present disclosure.

Reference is made to FIG. 8. As a variant implementation, the pressure sensing assembly 123 may be disposed between the cover plate 121 and the two-dimensional inputting assembly 122. That is, the three-dimensional touch assembly 12 includes a cover plate 121, a first adhesive layer 131, a pressure sensing assembly 123, a transmitting electrode layer 124, and a two-dimensional inputting assembly 122 that are sequentially stacked. The pressure sensing assembly 123 includes a conductive layer 1232, a pressure layer 1231, and a second adhesive layer 132 that are superimposed. The two-dimensional inputting assembly 122 includes a third adhesive layer 133 and a receiving electrode layer 1221 that are superimposed.

Figure 9:
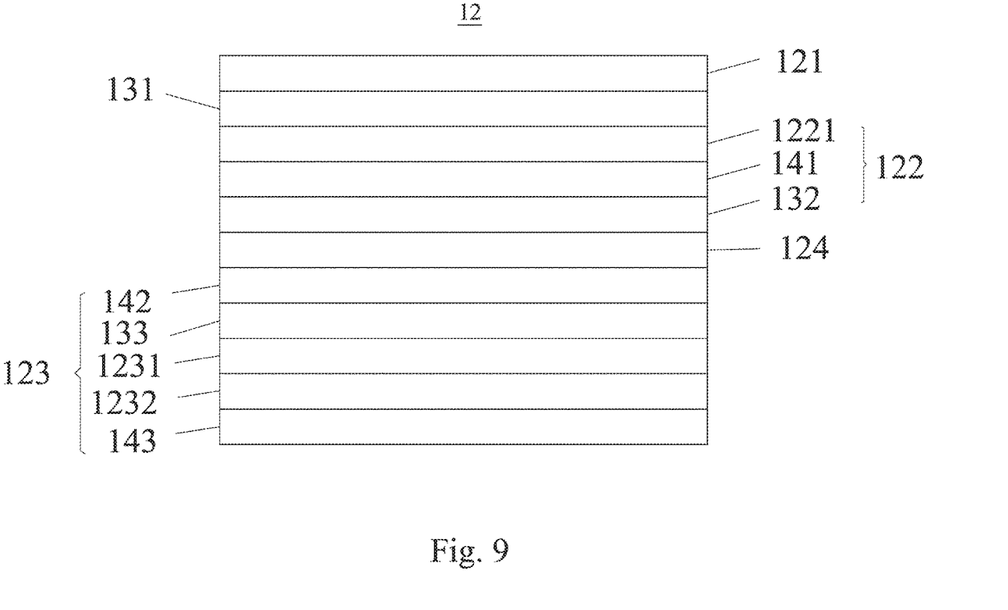
FIG. 9 is a schematic diagram of a layered structure of a second modified implementation of the three-dimensional touch assembly of the three-dimensional touch module of the first embodiment of the present disclosure.

Reference is made to FIG. 9. As a variant implementation, the three-dimensional touch assembly 12 includes a cover plate 121, a first adhesive layer 131, a two-dimensional inputting assembly 122, a transmitting electrode layer 124, and a pressure sensing assembly 123 that are sequentially stacked. The two-dimensional inputting assembly 122 includes a receiving electrode layer 1221, a first supporting layer 141, and a second adhesive layer 132 that are superimposed. The pressure sensing assembly 123 includes a second supporting layer 142, a third adhesive layer 133, a pressure layer 1231, a conductive layer 1232, and a third supporting layer 143 that are superimposed.

The material of the first supporting layer 141, the second supporting layer 142, and the third supporting layer 143 can be a flexible substrate or a rigid substrate, such as glass, tempered glass, sapphire glass, PI (polyimide), PC (polycarbonate), polyether sulfide (PES), polymethyl methacrylate (PMMA), acrylic, polyacrylonitrile-butadiene-styrene (ABS), polyamide (PA), polybenzimidazole polybutene (PB), polybutylene terephthalate (PBT), polyester (PE), polyether ether ketone (PEEK), polyether imide (PEI), polyether imide, polyethylene (PE), polyethylene terephthalate (PET), polystyrene (PS), polytetrafluoroethylene (PTFE), polyurethane (PU), polyvinyl chloride (PVC), or L-type polylactic acid (PLLA). In the present embodiment, the material of the supporting layers is polyethylene terephthalate (PET).

As another variation, when the pressure layer 1231 is made of polyvinylidene fluoride (PVDF) and the conductive layer 1232 is a silver nanowire conductive layer, the third supporting layer 143 can be omitted.

Figure 10:
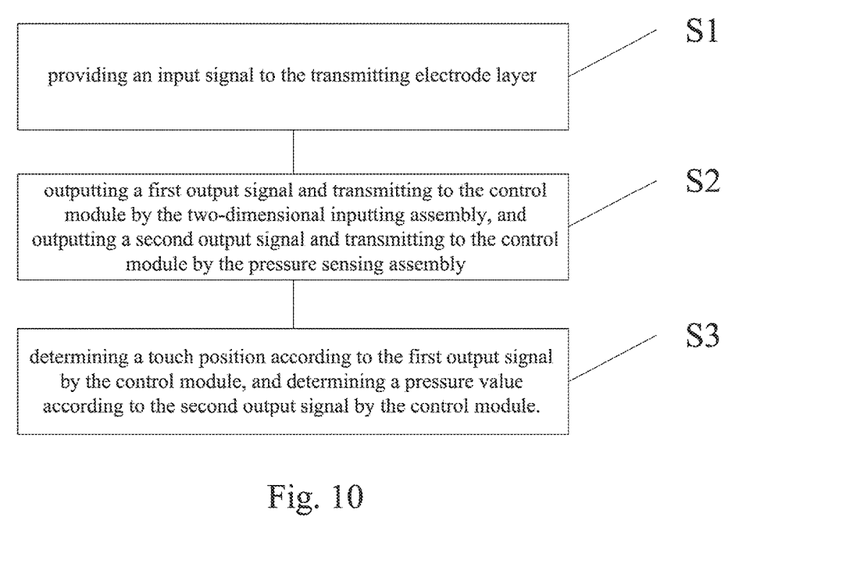
FIG. 10 is a schematic flowchart of a detection method of a three-dimensional touch module according to a second embodiment of the present disclosure.

Reference is made to FIG. 10. The detection method of a three-dimensional touch module provided in the second embodiment of the present disclosure is applied to the three-dimensional touch module 10 provided in the above-mentioned first embodiment. The three-dimensional touch module 10 includes a control module 11, a two-dimensional inputting assembly 122, a transmitting electrode layer 124, and a pressure sensing assembly 123. The detection method includes:

step S1: providing an input signal to the transmitting electrode layer 124;

step S2: outputting a first output signal and transmitting to the control module 11 by the two-dimensional inputting assembly 122, and outputting a second output signal and transmitting to the control module 11 by the pressure sensing assembly 123; and step S3: determining a touch position according to the first output signal by the control module 11, and determining a pressure value according to the second output signal by the control module 11.

Specifically, in the foregoing step S2, the first output signal and the second output signal are independent of each other.

In the present embodiment, the first output signal corresponds to a capacitive sensing signal of the touch position, and the detection approach includes capacitive detection. The second output signal corresponds to a piezoelectric signal of the pressure value, and the detection approach includes piezoelectric detection.

As an embodiment, the two-dimensional inputting assembly 122 and the pressure sensing assembly 123 share the transmitting electrode layer 124.

When the first output signal and the second output signal are output in an identical time sequence, the step S3 includes:

step Sa: receiving, by the control module 11, the capacitive sensing signal output by the two-dimensional inputting assembly 122 to complete detection of the touch position, and receiving, by the control module 11, the piezoelectric signal generated by the pressure sensing assembly 123 to complete detection of the pressure value.

Figure 11:
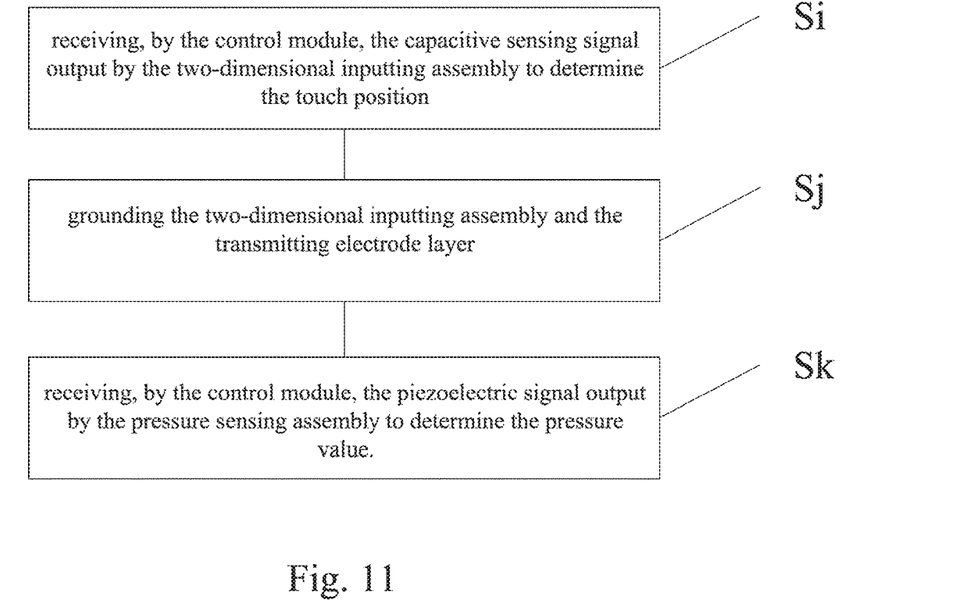
FIG. 11 is a schematic diagram of the flow of detecting output signals in different time sequences by the control module of the three-dimensional touch module according to the second embodiment of the present disclosure.

Reference is made to FIG. 11. When the first output signal and the second output signal are output in different time sequences, the step S3 includes:

step Si: receiving, by the control module 11, the capacitive sensing signal output by the two-dimensional inputting assembly 122 to determine the touch position;

step Sj: grounding the two-dimensional inputting assembly 122 and the transmitting electrode layer 124; and step Sk: receiving, by the control module 11, the piezoelectric signal output by the pressure sensing assembly 123 to determine the pressure value.

Specifically, in the present embodiment, the two-dimensional inputting assembly 122 further includes a receiving electrode layer 1221. The pressure sensing assembly 123 further includes a pressure layer 1231 and a conductive layer 1232 that are superimposed. The pressure layer 1231 is configured to generate the piezoelectric signal and transmit the piezoelectric signal to the conductive layer 1232, and the piezoelectric signal is output by the conductive layer 1232.

In the present embodiment, the two-dimensional inputting assembly 122 is a capacitive input assembly. As a variant implementation, the two-dimensional inputting assembly 122 may also be a resistive input assembly or an ultrasonic input assembly.

Figure 12:
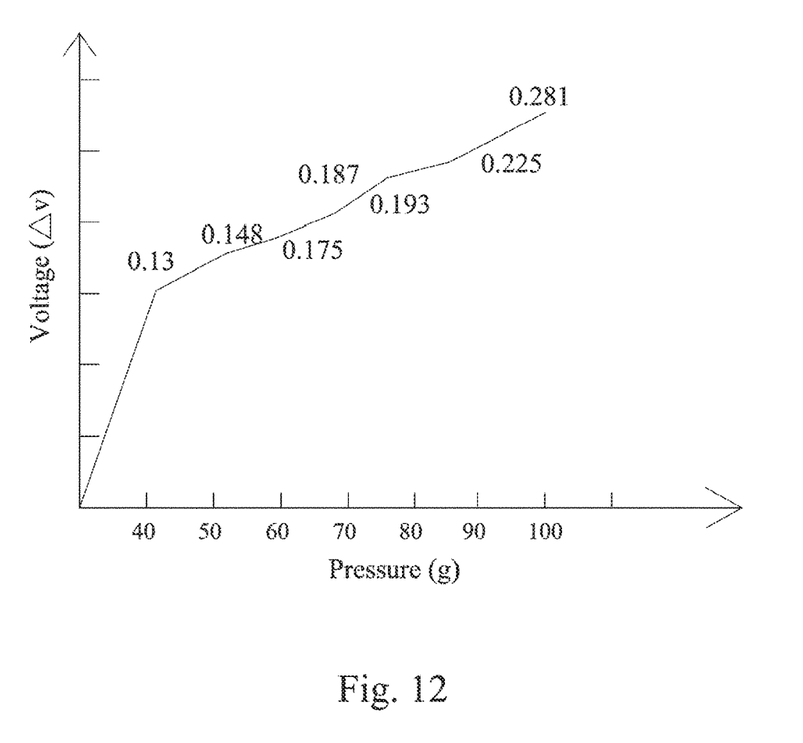
FIG. 12 is a schematic diagram of signal detection results of the three-dimensional touch module according to the second embodiment of the present disclosure.

In order to further illustrate the beneficial effects of the three-dimensional touch module 10 provided by the present disclosure relative to the prior art, the following test results can be referenced. Please compare FIG. 12 with FIG. 3, in which the horizontal axis is pressure value and the vertical axis is voltage difference. As shown in FIG. 12, using the three-dimensional touch module 10 provided in the first embodiment of the present disclosure and the detection method of the three-dimensional touch module 10 provided in the second embodiment of the present disclosure, as the pressure exerted by a finger or a stylus on the cover plate 121 increases, the piezoelectric signal detected by the control module 11 changes greatly. When the pressure value reaches 40 g, the voltage difference corresponds to 0.13V. Compared with FIG. 3, for the prior art, as the pressure exerted by the finger or the stylus on the cover plate 121 increases, the change of the piezoelectric signal detected by the control module 11 is relatively small. When the pressure value is 40 g, the voltage difference is only 0.042V.

Reference is still made to FIG. 12. In the present disclosure, when the pressure value is between 0 g and 60 g, as the pressure value changes continuously, the voltage difference changes more obviously. When the pressure value increases by 10 g, the voltage difference changes more than 0.01V. Compared with FIG. 3, for the prior art, when the pressure value is between 0 g and 60 g, the voltage difference changes less than 0.01V for every 10 g increase in the pressure value.

Figure 3:
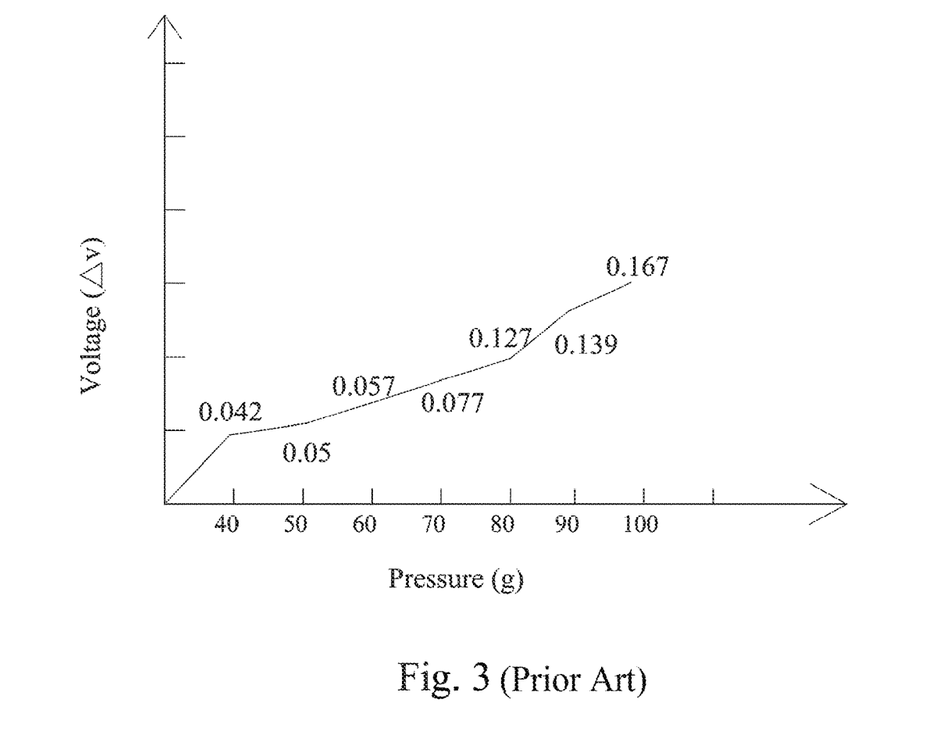
FIG. 3 is a schematic diagram of a signal detection result of a three-dimensional input module in the prior art.

It can be concluded from the above two sets of data that, compared with the prior art, the three-dimensional touch module 10 provided by the present disclosure is more sensitive to pressure value detection and is relatively more accurate.

Compared with the prior art, the three-dimensional touch module and the detection method thereof of the present disclosure have the following advantages:

(1) By arranging a two-dimensional input assembly and a pressure sensing assembly in the three-dimensional touch module, the three-dimensional touch module can output the first output signal and the second output signal through the two-dimensional inputting assembly and the pressure sensing input assembly, respectively, such that the control module directly analyzes the first output signal and the second output signal to obtain the touch position corresponding to the first output signal and the pressure value corresponding to the second output signal, and the configuration requirements for the control module are reduced, thereby effectively reducing the production and use cost of the three-dimensional touch module.

(2) The first output signal and the second output signal are independent of each other, which can effectively reduce the interference between the two signals in the signal extraction process of the control module and improve the accuracy of signal extraction.

(3) The first output signal corresponds to the touch position, and the second output signal corresponds to the pressure value. Through the setting of two types of signals, the difficulty of signal processing by the control module is greatly reduced, so that more different types of control modules can be adapted to this three-dimensional touch assembly. That is, it can make the scope of application of the three-dimensional touch assembly wider and can also effectively reduce the production cost and use cost of the control module.

(4) The two-dimensional input assembly and the pressure sensing assembly share the same transmitting electrode layer, so that different input signals are configured through the transmitting electrode layer, so that the first output signal and the second output signal being generated sequentially or simultaneously can be realized.

(5) The control module detects and processes the first output signal and the second output signal simultaneously, which can effectively improve the response speed of the three-dimensional touch assembly.

(6) The control module detects and processes the first output signal and the second output signal in different time sequences, so that the control module can detect the two signals more accurately. At the same time, the detection and processing method of different time sequences have lower requirements for the configuration of the control module, which can effectively reduce the production and use costs of the three-dimensional touch assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A detection method of a three-dimensional touch module, the detection method being applied to a three-dimensional touch module comprising a control module, a two-dimensional inputting assembly comprising a first electrode being a receiving electrode layer, a second electrode being a transmitting electrode layer, and a pressure sensing assembly, the detection method comprising:

step S1: providing an input signal to the transmitting electrode layer disposed between the two-dimensional inputting assembly and the pressure sensing assembly, wherein the two-dimensional inputting assembly and the pressure sensing assembly share the transmitting electrode layer;

step S2: outputting a first output signal and transmitting the first output signal to the control module by the receiving electrode layer of the two-dimensional inputting assembly, outputting a second output signal through a third electrode, the third electrode being a conductive layer of the pressure sensing assembly contacting a pressure layer of the pressure sensing assembly, the second electrode being disposed between the first electrode and third electrode the pressure layer having a first surface and a second surface and the conductive layer being superimposed on the first surface, and transmitting the second output signal to the control module by the pressure sensing assembly, wherein the first surface faces the conductive layer and faces opposite to a cover plate of the three-dimensional touch module; and step S3: determining a touch position according to the first output signal by the control module, and determining a pressure value according to the second output signal by the control module, wherein when the first output signal and the second output signal are output concurrently, the step S3 comprises:

step Sa: receiving, by the control module, the first output signal output by the receiving electrode layer of the two-dimensional inputting assembly to complete detection of the touch position, and receiving, by the control module, the second output signal generated by the pressure sensing assembly to complete detection of the pressure value.

2. The detection method of claim 1, wherein the first output signal and the second output signal are independent of each other.

3. The detection method of claim 1, wherein the two-dimensional inputting assembly is a capacitive input assembly, a resistive input assembly, or an ultrasonic input assembly.

4. The detection method of claim 1, wherein the first output signal corresponds to a capacitive sensing signal of the touch position, and the second output signal corresponds to a piezoelectric signal of the pressure value.

5. The detection method of claim 4, wherein when the first output signal and the second output signal are output in different time sequences, the step S3 comprises:

step Si: receiving, by the control module, the capacitive sensing signal output by the receiving electrode layer of the two-dimensional inputting assembly to determine the touch position;

step Sj: grounding the two-dimensional inputting assembly and the transmitting electrode layer; and step Sk: receiving, by the control module, the piezoelectric signal output by the pressure sensing assembly to determine the pressure value.

6. The detection method of claim 1, wherein the conductive layer is a silver nanowire conductive layer, a metal grid, or an indium tin oxide semiconductor transparent conductive film.

7. The detection method of claim 1, wherein the conductive layer is a silver nanowire conductive layer.

8. The detection method of claim 1, wherein the conductive layer is metal grid.

9. The detection method of claim 1, wherein the conductive layer is an indium tin oxide semiconductor transparent conductive film.

10. A three-dimensional touch module comprising a control module and a three-dimensional touch assembly electrically connected thereto, the three-dimensional touch assembly comprising:

a cover plate;

a two-dimensional inputting assembly disposed under the cover plate and comprising a first electrode being a receiving electrode layer, wherein the receiving electrode layer is configured to receive and output a first output signal, and the first output signal is generated by providing an input signal to a second electrode being a transmitting electrode layer; and a pressure sensing assembly disposed under the cover plate and comprising a pressure layer having a first surface and a second surface and a third electrode, the third electrode being a conductive layer superimposed on the first surface, wherein the first surface faces the conductive layer and faces opposite to the cover plate, the second electrode is disposed between the first electrode and third electrode, the two-dimensional inputting assembly and the pressure sensing assembly share the transmitting electrode layer, the pressure layer is connected to the transmitting electrode layer, the pressure layer is configured to generate a second output signal, and the conductive layer is configured to receive and output the second output signal, wherein when the first output signal and the second output signal are output concurrently, the transmitting electrode layer receives an input signal, and the receiving electrode layer outputs the first output signal to the control module to complete detection of a touch position, while the second output signal generated by the conductive layer relative to the control module is transmitted to the control module to complete detection of a pressure value.

11. The three-dimensional touch module of claim 10, wherein when the first output signal and the second output signal are output in different time sequences, in a first time sequence, the transmitting electrode layer receives an input signal, and the receiving electrode layer outputs the first output signal to the control module to complete detection of a touch position; and in a second time sequence, the transmitting electrode layer and the receiving electrode layer are grounded, and the conductive layer transmits the second output signal to the control module to complete detection of a pressure value.

12. The three-dimensional touch module of claim 10, wherein the first output signal is a capacitive sensing signal, a resistance signal, or an ultrasonic signal, and the second output signal is a piezoelectric signal.

13. The three-dimensional touch module of claim 10, wherein the pressure layer is between the two-dimensional inputting assembly and the conductive layer.

14. The three-dimensional touch module of claim 10, wherein the pressure sensing assembly is between the cover plate and the two-dimensional inputting assembly.

15. The three-dimensional touch module of claim 14, wherein the pressure layer is between the two-dimensional inputting assembly and the conductive layer.

16. The three-dimensional touch module of claim 10, comprising:
   a first adhesive layer between the receiving electrode layer and the transmitting electrode layer; and
   a second adhesive layer between the transmitting electrode layer and the pressure layer.

17. The three-dimensional touch module of claim 10, wherein the first output signal is an ultrasonic signal, and the second output signal is a piezoelectric signal.

* * * * *